United States Patent Office 2,851,424
Patented Sept. 9, 1958

2,851,424

FLUORESCENT COMPOSITIONS

Joseph L. Switzer, Gates Mills, and Robert C. Switzer, Shaker Heights, Ohio, assignors to Switzer Brothers, Inc., Cleveland, Ohio No Drawing. Application June 28, 1957
Serial No. 668,595

14 Claims. (Cl. 252—301.2)

This invention relates to improvements in fluorescent compositions in which fluoragents are carried in suitable carriers, and, more particularly, fluorescent coating compositions in which organic fluorescent dyes are incorporated in suitable carriers. This application is a continuation in part of our co-pending application for Fluorescent Displays, Serial No. 228,802, filed September 7, 1938, of our co-pending application for Fluorescent Compositions, Serial No. 414,285, filed October 9, 1941, of our co-pending application for Organic Fluorescent Compositions, Serial No. 452,522, filed July 27, 1942, and of our co-pending application for Organic Fluorescent Compositions, Serial No. 200,306, filed December 11, 1950, all now abandoned.

As pointed out in our above-entitled application for fluorescent displays, fluorescent compositions of the prior art, and particularly organic fluorescent coatings on surfaces of articles exposed to sunlight and weathering conditions, exhibited a rapid depreciation in fluorescence when subjected to the destructive influence of actinic radiations and reactive gases and vapors normally present in the atmosphere. Inasmuch as the destructive actinic radiations of sunlight or artificial light are largely ultra-violet rays, the most practical and available form of fluorescigenous radiant energy, the provision of an organic fluorescent composition which would possess sufficient "light-fastness" to render the compositions commercially practical seemed to be an extremely difficult, if not hopeless, problem, since the radiant energy normally employed to excite the fluorescent compositions to fluorescence includes the very same energy which deteriorated the compositions. It is the object and purpose of this invention, however, to provide commercially practical organic fluorescent compositions which will exhibit fluorescence after prolonged exposure to actinic radiations and weathering conditions.

The fluoragents available to the prior art could be classified either as fluorescent pigments or as organic fluorescent dyes. The term "organic fluorescent dyes" as employed in this specification and the appended claims includes soluble fluorescent dyestuffs, fluorescent intermediates, and like fluorescent organics, except unsubstituted hydrocarbons. Of the two classes of fluoragents, i. e., the pigments and the dyes, the dyes were often brilliantly fluorescent in solution in solvents or vehicles such as resins and gums, but such dissolved dyes were particularly fugitive and unstable, as was more or less expected from the soluble and organic nature of the dyes.

We have discovered, however, that when such heretofore fugitive and unstable dyes are dissolved in either solutions or suspensions of incompletely polymerized resins of the amide-aldehyde type and the resin is then completely polymerized, the resultant fluorescent compositions exhibit a fluorescent life from approximately 10 to more than 100 times greater than the heretofore expected fluorescent life of such dyes. As is known, the preparation of a resin normally proceeds through several stages until the resin is completely polymerized. We have discovered that unless the resin is completely polymerized there may be no appreciable extension of the fluorescent life of the dye and in some instances when the resin is not polymerized to the final complete stage, the fluorescent life of the dye may be even less than that which would have been heretofore expected.

We are unable to account fully for the unexpected stability and relative permanence of the fluorescent dyes dissolved in completely polymerized resins of the amide-aldehyde type. The prolonged fluorescent life of the compositions cannot be attributed entirely to the carrier resins, per se, since fluoragents other than dissolved dyes do not exhibit appreciable increase in fluorescent life when incorporated in resins of the amide-aldehyde type.

Possibly the prolonged life and stability of the fluorescent dyes are due to the fact that, in addition to being enveloped in a dense, infusible medium which is inert and insoluble with respect to the dyes and atmospheric gases and vapors which might react with the dyes, the molecular dispersion (i. e., solution) of the dyes in the resins which is obtained permits the dyes to achieve a state approaching molecular compound formation with the resins. Another possibility suggested by some of our testing and experimentation is that stabilization of the dyes by the resins possibly may not be the direct mechanism involved, but, rather, an indirect result of another mechanism in which the dyes themselves retard the breakdown of the resins under actinic conditions and, thereby, retard the formation of products of resin dissociation which deteriorate the dyes. The prolonged fluorescent efficiency which we discovered in fluorescent dyes dissolved in polymerized amide-aldehyde resins suggests that there would also be a prolonged conversion, to light of a lower energy level, of actinic radiation which might otherwise adversely affect the solvating resins. Still other theories may be later developed to explain the mechanism by which the results of our invention are obtained.

Another advantage of coating compositions made according to our invention is that the compositions are not adversely affected by other agents or operations normally employed to adapt the compositions to specific uses. For example, when using the amide-aldehyde resins, one may first use solvents, suspension liquids, or like secondary agents to give the incompletely polymerized resins proper body and viscosity and then employ heat and/or polymerization accelerators to completely polymerize the resins in which the dye has been dissolved. After the compositions have been completely polymerized, the compositions may be ground to small particle sizes and used as relatively non-fading pigments in suitable vehicles transparent to visible light and ultraviolet. Such vehicles act as film-forming binders binding the pigment particles to each other and to the surface on which the resultant coating composition is applied.

Examples of amide-aldehyde resins which may be used for producing the organic fluorescent compositions of the present invention include urea-formaldehyde (carbamide-formaldehyde) and the monohydric aliphatic alcohol modified urea-formaldehyde resins, such as the methyl, butyl, isobutyl, and octyl alcohol modified urea-formaldehyde resins, for example. Urea-formaldehyde resins may also be modified with polyhydric alcohols, such as butanediol, glycerine, pentaerythritol, sorbitol, and the like. Other suitable amide-aldehyde resins also include dicyandiamide-formaldehyde, urea-acetaldehyde, biuret-formaldehyde, isocyanuric acid diimide-formaldehyde, cyanuramide-formaldehyde, butyl alcohol modified cyanuramide-formaldehyde and cyanuramide-butyraldehyde resins. In addition various mixed or co-condensed polymeric resins may be used, as for example, carbamidebutylcarbamide - formaldehyde, acetamide-urea-formaldehyde and toluene sulfonamide-urea-formaldehyde resins.

These foregoing stabilizing amide-aldehyde resins appear to be most effective with fluorescent dyes of the xanthene and naphthyl-imide classes. Well-known fluorescent dyes of the xanthene class are generally alkylaminophenol phthaleins, their alkyl esters and acid salts thereof, such as, for example, Meta diethylaminophenol phthalein hydrochloride
Meta diethylaminophenol succein hydrochloride
Meta monoethylaminophenol phthalein hydrochloride
The ethyl ester of meta monobutylaminophenol phthalein
Meta aminophenol phthalein hydrochloride
Meta mono-ethylaminophenol phthalein
Meta monoethylaminophenol phthalein ethylester hydrochloride Well-known fluorescent dyes of the naphthyl-imide class are generally amino or alkylamino (substituted in the 4 position) 1,8 naphthal imides, alkyl imides or cyclic imidines, such as, for example, the inner imide of 2 [4' amino 8' carboxynaphthyl (1')] benzimidazole sodium sulfonate; 4 amino 1,8 naphthal p-xenylimide; 4 amino 1,8 naphthal (2',4' dimethyl phenyl) imide; (4 n-butylamino) 1,8 naphthal n-butyl imide; and 4 aminosulfo 1,8 naphthal 4' methylphenyl imide.

By way of illustration but not as limitations, the following examples are given of fluorescent composition made according to our invention.

*Example 1*

An aqueous suspension of carbamide-formaldehyde resin (urea-formaldehyde resin) containing 1% by weight of the solid resin of a fluorescent dye such as the inner amide of 2 [4' amino 8' carboxynaphthyl (1')] benzimidazole sodium sulfonate.

*Example 2*

One part of a xanthene basic dyestuff, such as, for example, the ethyl ester of meta ethylaminophenolphthalein dissolved in 250 parts of a resinous solution composed of six parts of butyl alcohol-modified carbamide-formaldehyde resin and four parts of butyl alcohol.

*Example 3*

One part of an acridene basic dyestuff, such as, for example 2 amino, 9 (4' aminophenyl) acridonium nitrate is dissolved in 200 parts of a resinous soluton composed of equal parts of octyl alcohol and octyl alcohol-modified carbamide-formaldehyde resin.

*Example 4*

An aqueous suspension of cyanuramide-formaldehyde resin (melamine-formaldehyde resin) containing not more than 5% nor less than 0.2% by weight of the solid resin of a fluorescent dye such as p,p' di [ p'' (p'' amino benzoylamino) benzoylamino] stilbene o,o' di [sodium sulphonate].

*Example 5*

One part of meta monobutylaminophenol-phthalein is dissolved in 200 parts of a resinous solution composed of eleven parts of butyl alcohol-modified cyanuramide-formaldehyde resin and nine parts of butyl alcohol.

*Example 6*

4 parts of a fluorescent naphthyl-imide dye, 4 amino 1,8 naphthal p-xenylimide, are added to a resinous solution comprised of 136 parts of the methyl-ethyl derivative of methylol melamine (75% solids), 46 parts of mixed ortho (60%) para (40%) toluene sulfonamide and 85 parts of formaldehyde, the components of the resinous solution having been heated until dissolved.

As indicated above, each of the above examples may be polymerized by the application of heat and/or a polymerization catalyst, the time and temperature of cure, as is well known in the art, varying according to the specific resin used and the amount and type of catalyst, if employed. Thus, as indicated in our copending application, Serial No. 414,285, a solution as specified in Example 2 may be cured at 200° F. in two hours or at 250° F. in one hour. Polymerization catalysts are usually acids. Thus, if a polymerization catalyst, such as a small quantity of hydrochloric acid, is added to the solution of Example 2, the polymerization time and/or temperature will be reduced. With or without a polymerization catalyst, the polymerized resins may also be termed "heat-treated" or "thermo-set." The term "polymerized," if not otherwise qualified, is to be understood to mean completely polymerized and not to include partial or stage polymerization short of final or complete polymerization. At such final or complete polymerization the resins are infusible and insoluble in nearly all solvents; further application of heat, short of that which will char or disintegrate the resins, will produce no appreciable physical changes.

When the dyed fluorescent resinous compositions have been polymerized, they are preferably, as indicated above, reduced to a fine, nearly impalpable powder, which may then be dispersed into any suitable vehicle, preferably solutions of transparent non-yellowing vehicles such as solutions of acrylic or polystyrene resins. However, certain of the alcohol-modified urea-formaldehyde compositions as called for in the appended claims may be initially applied (to suitable supporting surfaces) as paints, lacquers, inks, impregnating agents and the like (by brushing, spraying, printing, or like operations) in the form of coating compositions or impregnants in which the resins are not completely polymerized; stable fluorescent compositions are then produced by causing or allowing the applied coating compositions to solidify and become completely polymerized. When the incompletely polymerized alcohol-modified urea-formaldehyde resins are applied in the form of solutions of the dye and resin in a volatile solvent, thus constituting lacquers or spirit varnishes, the volatile solvent has preferably a lower boiling point than the temperature at which the resin polymerizes.

The alcohol-modified urea-formaldehyde resinous solutions not only exert an excellent stabilizing effect upon fluorescent dyes dissolved therein (when the resins are polymerized) but also serve as acceptable lacquers having a reduced tendency to craze during polymerization. However, when such lacquers are applied to a backing sheet, the final polymerized alcohol-modified urea formaldehyde coating may tend to be relatively thin and brittle; therefore, such backing sheets are often preferably of metal, glass, or similar stiff material resistant to bending or flexing that could crack the polymerized coating. In each application or use of our compositions various modifications may have to be made by those skilled in the art to adapt our compositions to the specific use intended. Our invention, therefore, is not limited by the scope of the embodiments disclosed, in either the whole or in part, but by the scope of the following claims.

What is claimed is:

1. A coating composition comprising a substantially pure thermo-setting alcohol-modified urea-formaldehyde resin, a fluorescent dye dissolved in said resin, and an alcohol in which said resin is dissolved.

2. A liquid coating composition comprising a substantially pure non-reactive thermo-setting transparent alcohol-modified urea-formaldehyde resin, a fluorescent ingredient dispersed and enveloped in said resin, and an alcohol in which said resin is dissolved.

3. A coating and impregnating composition consisting of a substantially pure transparent thermo-setting alcohol-modified urea-formaldehyde condensation product, a fluorescent ingredient dispersed and enveloped in said condensation product, and a volatile liquid having a boiling point lower than the thermo-setting point of said condensation product.

4. A thermo-setting spirit varnish comprising a substantially pure non-reactive thermo-setting transparent alcohol-modified urea-formaldehyde resin, a fluorescent dye soluble in said resin, and butyl alcohol in which said resin is dissolved.

5. A coating composition comprising a substantially pure urea-formaldehyde thermo-set condensation product, a fluorescent ingredient dispersed and enveloped in said condensation product, said condensation product being in a finely ground powdered state, and a transparent vehicle for said thermo-set condensation product.

6. A coating composition comprising a substantially pure urea-formaldehyde polymerized infusible resin, a fluorescent dye dissolved in said resin, said resin being in a powdered state, and a transparent vehicle for said resin.

7. A coating composition comprising a substantially pure alcohol-modified urea-formaldehyde thermo-set resin, a fluorescent dye dissolved in said resin, said resin being in a powdered state, and a transparent vehicle for said resin.

8. A composition of matter comprising a thermo-set substantially pure transparent alcohol-modified urea-formaldehyde resin, and a fluorescent dye dissolved in said resin, said resin being non-reactive with said dye.

9. In an article of manufacture, a stiff backing sheet, a thermo-set substantially pure alcohol-modified urea-formaldehyde resin fused upon and covering a surface of said backing sheet, and a fluorescent ingredient dispersed and enveloped in said resin.

10. In an article of manufacture, a stiff backing sheet, a polymerized infusible substantially pure alcohol-modified urea-formaldehyde resin fused upon said sheet and a fluorescent dye dissolved in said resin, said resin being non-reactive with said dye.

11. A fluorescent coating composition comprising a polymerized infusible resin, a fluorescent dye dissolved in said resin, said resin being in a powdered state, and a transparent vehicle for said resin, said fluorescent dye being of the class consisting of xanthene dyestuffs and naphthyl-imide dyestuffs and said resin being of the class consisting of urea formaldehyde; urea-formaldehyde modified by monohydric alcohols consisting of methyl, butyl, isobutyl, and octyl alcohols; urea formaldehyde resins modified by polyhydric alcohols consisting of butanediol, glycerine, pentaerythritol, and sorbitol; di-cyandiamide-formaldehyde; urea-acetaldehyde, bierut-formaldehyde; isocyanuric acid di-imide-formaldehyde; cyanuramide-formaldehyde, butyl alcohol modified cyanuramide-formaldehyde; cyanuramide-butyraldehyde; carbamide-butyl-carbamide-formaldehyde; acetamide-urea-formaldehyde; and mixtures and co-condensates including co-condensates with toluene sulfonamide thereof.

12. A coating composition as defined in claim 11 in which the powdered resin is a heat-reacted dyed resin comprised of cyanuramide formaldehyde.

13. A coating composition as defined in claim 11 in which the powdered resin is a heat-reacted dyed resin comprised of co-condensed cyanuramide-formaldehyde and toluene sulfonamide.

14. A coating composition as defined in claim 11 in which the powdered resin is a heat-reacted dyed resin comprised of co-condensed urea formaldehyde and toluene sulfonamide.

References Cited in the file of this patent
UNITED STATES PATENTS

| | | |
|---|---|---|
| 2,113,090 | McKeag | Apr. 5, 1938 |
| 2,541,184 | Ackerman | Feb. 13, 1951 |
| 2,809,954 | Kazenas | Oct. 15, 1957 |